US010011967B2

(12) United States Patent
Kriegstein

(10) Patent No.: US 10,011,967 B2
(45) Date of Patent: Jul. 3, 2018

(54) CONTINUITY CONNECTION SYSTEM FOR RESTORATIVE SHELL

(71) Applicant: Warstone Innovations, LLC, Ventura, CA (US)

(72) Inventor: Stewart Kriegstein, Ventura, CA (US)

(73) Assignee: Wasstone Innovations, LLC, Ventura, CA (US)

( * ) Notice: Subject to any disclaimer, the term of this patent is extended or adjusted under 35 U.S.C. 154(b) by 0 days.

(21) Appl. No.: 15/418,772

(22) Filed: Jan. 29, 2017

(65) Prior Publication Data

US 2017/0218588 A1   Aug. 3, 2017

Related U.S. Application Data

(60) Provisional application No. 62/289,718, filed on Feb. 1, 2016.

(51) Int. Cl.
*E02D 31/06* (2006.01)
*E02D 5/06* (2006.01)
(Continued)

(52) U.S. Cl.
CPC .......... *E02B 17/0026* (2013.01); *B29C 63/06* (2013.01); *B29C 65/48* (2013.01);
(Continued)

(58) Field of Classification Search
CPC .. E02D 5/64; E02D 5/226; E02D 5/60; E02D 31/06; E04F 13/0736; E04G 23/0218;
(Continued)

(56) References Cited

U.S. PATENT DOCUMENTS 2,191,248 A * 2/1940 Cappel .................... E02D 5/60
405/216
4,023,374 A * 5/1977 Colbert .................... E02D 5/64
138/159
(Continued)

FOREIGN PATENT DOCUMENTS

JP       2008-248659    10/2008
WO      WO 87/06286     10/1987

OTHER PUBLICATIONS

PCT International Search Report and Written Opinion, International Appliction No. PCT/US17/015533, dated Apr. 5, 2017, pp. 1-8.

*Primary Examiner* — Andrew J Triggs

(57) ABSTRACT

A continuity connection system is disclosed that is highly durable, simple to install, and substantially increases the structural capabilities and weight-bearing capacity of a shell (i.e., a form or jacket). The shell can be used to protect a weight-bearing member (e.g., a cement column) from a degrading environment. The shell can have one or several layers of carbon fiber fabric (e.g., spaced apart longitudinally) wrapped around an interior of the shell or embedded within the shell. The continuity connection system is used to provide continuity between two ends of the carbon fiber layer, and can be made up of the carbon fiber fabric reinforcement layer, two pockets, and a laminate having ends positioned in each pocket. The carbon fiber laminate traverses a seam/separation of the carbon fiber fabric and/or a seam of the shell and can be retained in place within the pockets with an appropriate epoxy, for example.

14 Claims, 8 Drawing Sheets

(51) Int. Cl.
*E02B 17/00* (2006.01)
*E02D 5/64* (2006.01)
*E02D 5/22* (2006.01)
*B29C 63/06* (2006.01)
*B29C 65/48* (2006.01)
*B29C 65/00* (2006.01)
*E02D 5/60* (2006.01)
*E04F 13/073* (2006.01)
*E04G 23/02* (2006.01)
*B29K 307/04* (2006.01)
*B29L 31/10* (2006.01)

(52) U.S. Cl.
CPC ........ *B29C 66/431* (2013.01); *E02B 17/0017* (2013.01); *E02D 5/226* (2013.01); *E02D 5/60* (2013.01); *E02D 5/64* (2013.01); *E02D 31/06* (2013.01); *E04F 13/0736* (2013.01); *E04G 23/0218* (2013.01); *B29K 2307/04* (2013.01); *B29L 2031/10* (2013.01); *E02D 2250/0007* (2013.01); *E02D 2300/0021* (2013.01); *E02D 2300/0026* (2013.01); *E02D 2300/0068* (2013.01)

(58) Field of Classification Search
CPC ............. E02B 17/0017; E02B 17/0026; B29C 66/431; B29C 63/06; B29C 65/48; B29K 2307/04
See application file for complete search history.

(56) References Cited

U.S. PATENT DOCUMENTS

| | | | | |
|---|---|---|---|---|
| 4,439,070 | A | * | 3/1984 | Dimmick ................. E02D 5/64 24/271 |
| 4,764,054 | A | * | 8/1988 | Sutton ..................... E02D 5/226 137/855 |
| 5,226,751 | A | * | 7/1993 | Doleshal ................. E02D 5/60 405/211.1 |
| 5,435,667 | A | | 7/1995 | Strange |
| 5,469,985 | A | * | 11/1995 | Furuichi ................ B65D 7/045 206/509 |
| 5,633,057 | A | | 5/1997 | Fawley |
| 5,816,746 | A | * | 10/1998 | Blair ....................... E01D 19/02 405/216 |
| 8,959,871 | B2 | * | 2/2015 | Parenti .................... E04C 3/36 52/170 |
| 2013/0014467 | A1 | * | 1/2013 | Ehsani ..................... E04C 3/36 52/741.3 |
| 2017/0218588 | A1 | * | 8/2017 | Kriegstein ............. E02B 3/106 |

* cited by examiner

CONTINUITY CONNECTION SYSTEM FOR RESTORATIVE SHELL

CROSS-REFERENCE TO RELATED APPLICATIONS

The present invention claims priority to U.S. provisional application No. 62/289,718, filed on Feb. 1, 2016, which application is incorporated herein by reference in its entirety.

BACKGROUND

Piles or columns supporting a vertical load can deteriorate over time, particularly in marine environments. Tides, water currents, sedimentary sand abrasion, floating debris, marine insects, wide temperature gradients, and weathering all contribute to deterioration of the column while the column bears a continuous load. Bridges and docks are examples of architectural structures that are supported by columns in marine environments. Columns can be made of concrete, steel, or wood, for example. Deteriorated columns, or more generally, weight-bearing members, are typically repaired in place because of the high cost to replace each column that requires repair. Moreover, even as our infrastructure ages, there is inevitably little public funding available to replace or build anew; rather, existing structures are often necessarily repaired and strengthened to save cost. Column restoration is a dangerous and arduous process because the columns often extend several feet under water and are difficult to access. Further, rehabilitating marine columns often must be done quickly because much of the repair takes place while under water and under tidal influence. Occasionally, the repair site must be "de-watered" to prevent water from interfering with the column restoration.

Shells or jackets have been introduced to protect columns from further deterioration. Shells are designed to surround the column above and below the area of deterioration. A shell is placed around the column and then grout or an epoxy can be poured or pumped into the space between the shell and the column. The shell provides a permanent form that protects the column from further deterioration while retaining the epoxy or grout that fills the voids in the column. The epoxy or grout also prevents water or environmental deteriorants from contacting the damaged portion, or any other covered portion, of the column. However, little structural capacity is added to the column by the shell and epoxy or grout combination.

Shells that can both increase the structural capacity of columns and at the same time protect the columns from deterioration are desirable in many situations. For example, bridges that were built several decades ago may be supported by columns that were designed to support smaller loads and comply with less stringent design standards than are required by today's codes and regulations. A bridge built in 1950, for example, may have been designed and built to support trucks up to 40,000 lbs, and would need to be enhanced to support increased traffic and the heavier trucks of today (e.g., 70,000 lbs), as well as to comply with more stringent structural codes and regulations. Moreover, the columns supporting such a bridge may have deteriorated over time such that the weight-bearing capacity of the bridge has decreased. In some columns, such as wood or timber columns, the deterioration may have taken place inside the column and may be difficult to see or estimate the degradation of structural capacity.

Conventional shells are limited in ability to substantially increase the structural capacity of weight-bearing members because they are limited to the strength of the shells themselves, or more specifically, the connection at the seam in the shell. Examples of conventional shells are disclosed in U.S. Pat. No. 4,019,301 to Fox. Such conventional shells lack reinforcement and a continuity connection system that provides continuity for both the reinforcement and the shell, which continuity connection systems substantially increase the confinement strength of the system. Conventional shells may be strengthened in some manner on the exterior of the shell, but such additional support is subject to the same tides, water currents, sedimentary or sand abrasion, floating debris, marine insects, wide temperature gradients, and weathering that caused deterioration of the column in the first place.

Conventional shells do not have structural enhancements built within or into the shell, such as a reinforcement layer and a continuity connection system, that substantially enhance the structural capacity of the column. The present invention has been found to substantially increase the structural capacity and solve many problems inherent in conventional shells and column-restorative procedures, and may prove helpful in rehabilitating and strengthening an aging infrastructure.

OVERVIEW

The embodiments disclosed herein increase the structural capacity of construction repair systems, such as a "shell" or "jacket" systems, and reinforcement systems, such as axial reinforcement systems. The disclosed embodiments can be used to strengthen various weight-bearing members, such as columns, in any environment, and not merely in marine environments. In systems developed previously by the present inventor, a manufactured fiberglass shell (for example, a glass fiber reinforced polymer (GFRP) shell) is installed around an existing column made of steel, concrete or wood, for example, which column supports a structure such as a road, bridge, building, pier or dock, for example. A grout is placed between the column and the inside of the shell. Exemplary grout materials include epoxy or cementitious mixtures. An exemplary cementitious mixture is an underwater, fast-setting cementitious grout. A grout-filled or epoxy-filled shell system can be utilized when the original structural design capacity of the column has been degraded due to damage, decay, or abrasion of the pile, or when additional strengthening is required. The grout-filled or epoxy-filled shell system can be utilized in a marine environment or underwater, where all of the components are required to be non-corrodible. Existing systems, however, often fail to increase the capacity of a degraded column back to the original design specifications, or to enhanced design requirements, including a factor of safety, as required by design standards, codes, or regulations.

The embodiments disclosed herein address the deficiencies found in earlier systems and add to the usefulness of earlier systems. Specifically, by producing the fiberglass shell with a reinforcing "continuity connection" system on the interior of the shell, substantial additional structural capacity can be achieved which meets or exceeds the required structural design capacity of the column, including a required factor of safety. An exemplary continuity connection system comprises one or more layers of carbon fiber fabric with a specific orientation of fibers (such as in a radial direction of the shell); a pocket attached to the inside of the shell on each side of a seam of the shell and a seam of the carbon fiber fabric layer(s); a laminate strip of hardened carbon fiber positioned within the pockets and overlapping the seam of the shell and the seam of the carbon fiber fabric layer(s); and an epoxy to retain the elements of the continuity connection together. The combined elements of the continuity connection may be referred to as a continuity connection system.

The carbon fiber fabric used in exemplary embodiments can be inlayed on an interior surface of the shell, or can be embedded within the carbon fiber shell, or both. The carbon fiber fabric can be one or more layers thick and can be unidirectional or bi-directional, for example. In exemplary embodiments, a carbon fiber fabric having a unidirectional fiber orientation in the radial direction of the shell is preferred. In the exemplary embodiments, the carbon fiber fabric is saturated with an appropriate saturating epoxy or resin and inlayed on an interior surface of the shell such that the saturated carbon fiber fabric adheres to and strengthens the shell in a radial direction. Hereafter, a carbon fiber fabric that has been saturated in an epoxy or resin and adhered on an interior surface (e.g., inlayed) or embedded within the shell may be referred to as a "carbon fiber fabric" or simply as "carbon fiber." However, it should be appreciated that other fibers may be used other than carbon fibers, such as glass, or aramid, or Kevlar fibers, for example. As an alternative to an internal continuity connection, an external continuity connection can be formed on the outside of a shell when carbon fiber fabric is wrapped around an exterior surface of the shell, for example, using the same or similar components as used in the internal continuity connection system. However, it is preferred that the carbon fiber fabric be inlayed on an interior surface of the shell, or embedded within layers of the shell, and that the continuity connection system be within the shell so that the carbon fiber layer(s) and continuity connection are protected from the deteriorating elements described above, thereby substantially increasing the longevity of the continuity connection system.

The carbon fiber fabric that is inlayed or embedded into the shell may be any of several types of carbon fiber fabric, as would be appreciated by one of ordinary skill in the art. Preferably, the carbon fiber discussed here is a fabric made of unidirectional woven carbon filaments. In another example, the carbon fiber fabric may be bidirectional, i.e., having fibers aligned in a radial direction and in a longitudinal direction of shell. Carbon fibers have a high tensile strength, low weight, high chemical resistance, high temperature tolerance and low thermal expansion, which makes them suitable for use in the present invention. However, carbon fiber is relatively expensive. Therefore, it is preferred that the carbon fiber fabric be radially inlayed or radially embedded into the shell in strips around the shell, as opposed to blanketing the entire inside surface (or embedded throughout the entire surface) of the shell. However, the latter is also an option for use in the present invention. In either case, there still remains a seam in the carbon fiber as a result of a seam or separation in the shell, which separation is typically required to allow the shell to open and wrap around a column. The continuity connection disclosed herein provides continuity over that seam or separation, using innovative pockets and an overlapping connection made up of, for example, a carbon fiber laminate, that bridges the seam or separation in the inlayed or embedded carbon fiber and shell.

Exemplary carbon fiber laminates include prefabricated carbon fiber reinforced polymer sheets, having one or several layers, and embedded or saturated in an epoxy resin, and thereafter hardened and cured. Other types of fibers may be used such as glass, aramid, or Kevlar fibers, for example. Further, other types of resins may be used such as ester, vinyl, or polyester, for example. The laminates used in the present invention may be substantially rigid at or below room temperature, and may have a shape that corresponds to a shell interior, such that the laminate may have a radius of curvature. The present disclosure will generally refer to the laminates as "carbon fiber laminates," though other types of laminates can be used, as can other types of materials.

To provide a shell (i.e., a form or jacket) that protects a column from a corrosive environment and substantially increases the structural capacity of the column, and which can be installed quickly, the present inventor has recognized, among other things, that a shell integrated with one or more carbon fiber fabric layers; "pockets;" and one or more carbon fiber laminates can offer several advantages over conventional shells. In some examples, the shell can be round to encapsulate a round column. In other examples, the shell can be square or rectangular to encapsulate a square or rectangular pile. In each example, the elements of the continuity connection system can match a shape of the shell. For example, with a round or columnar shell, the carbon fiber layer, pockets, and/or carbon fiber laminate can have a radius of curvature that matches or corresponds to a radius of curvature of the shell. Alternatively, the pockets and/or carbon fiber laminate can have a radius of curvature that is less than or greater than a radius of curvature of the shell. When the continuity connection is placed on a flat surface of the shell, such as when the shell comprises a square or rectangular shape, the elements of the continuity connection system can be flat or planar at the location of the continuity connection, so as to match the planar nature of the shell at that location. Of course, the carbon fiber layer would not be "planar" about its entire surface area, but would follow the contours of the square or rectangular shape from one end of the shell's seam to the other. In some examples, several continuity connection systems can be used along a longitudinal length of the shell, for example at every level of inlayed or embedded carbon fiber. Additional non-limiting examples and designs are explained in more detail below. The exemplary designs disclosed herein can (1) enhance the structural capacity of the column, (2) protect the column from corrosion, (3) protect the reinforcing structure and continuity connection system from corrosion, and (4) be simple to install.

To further illustrate the apparatuses and systems disclosed herein, the following non-limiting examples are provided:

Example 1 is a system comprising a shell configured to encapsulate at least a portion of a weight-bearing member, the shell having a first end portion and a second end portion; a reinforcing layer within the shell, the reinforcing layer extending proximate the first end portion to proximate the second end portion of the shell; a first pocket and a second pocket adhered to the shell, each pocket having an interior portion; and a laminate having a first end and a second end, the first end positioned within the interior portion of the first pocket, and the second end positioned within the interior portion of the second pocket, the first end adhered to the first pocket and the second end adhered to the second pocket, wherein the first pocket and the second pocket are positioned on the shell such that the laminate extends across the first end portion and the second end portion to provide continuity between two ends of the reinforcing layer.

Example 2 is a method of providing a shell configured to encapsulate at least a portion of a weight-bearing member, the shell having a first end portion and a second end portion; inlaying a reinforcing layer within the shell such that the reinforcing layer extends proximate the first end portion to proximate the second end portion of the shell; adhering a first pocket and a second pocket to an interior of the shell, each pocket having an interior portion; providing a laminate having a first end and a second end; positioning the first end of the laminate within the interior portion of the first pocket, and positioning the second end of the laminate within the interior portion of the second pocket; and adhering the first end of the laminate to the first pocket and adhering the second end of the laminate to the second pocket, wherein the first pocket and the second pocket are positioned on the shell such that the laminate extends across the first end portion and the second end portion to provide continuity between two ends of the reinforcing layer.

These and other examples and features of the present structures and systems will be set forth by way of exemplary embodiments in the following detailed description. This overview is intended to provide non-limiting examples of the present subject matter and is not intended to provide an exclusive or exhaustive explanation. The detailed description below is included to provide further information about the inventive structures and methods.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various examples discussed in the present disclosure.

FIG. 1 also shows that a carbon fiber fabric can extend along a longitudinal length of the shell.

DETAILED DESCRIPTION

The present application relates to systems and methods for column or pile restoration and/or reinforcement. For example, the present application discloses a shell and a "continuity connection" attached to the shell, which may be referred to as a continuity connection system. The continuity connection system can comprise one or more carbon fiber fabric layers, a pair of pockets attached to the inside of the shell on each side of a seam in the shell, a laminate strip of carbon fiber positioned within channels of the pocket and overlapping the seam of the shell, and epoxy to retain the elements of the continuity connection together. In effect, two ends of the one or more carbon fiber fabric layers and shell are connected together using the pockets, a laminate strip of carbon fiber, and epoxy, thereby providing "continuity" across the seam in the carbon fiber fabric layer and ends of the shell. A carbon fiber fabric layer having such continuity can provide confinement structural properties and have a tensile strength that substantially surpasses the tensile strength of a conventional connection that connects two ends of a shell, such as a tongue-and-groove connection or a mechanically fastened connection at the seam of the shell. More specifically, carbon fiber fabric layer(s) having such reinforcing elements and added continuity can provide additional confinement strength to the shell, which strength can exceed the tensile strength of steel "rebar," for example. The exemplary continuity connections disclosed herein can be used in conjunction with axial reinforcement members, such as steel rebar or carbon fiber laminate installed in an axial direction of the system. When using the exemplary continuity connections with axial reinforcement members the vertical load carrying capacity of the column and the flexural capacity of the column are substantially increased. In one example of a column being strengthened and protected using the exemplary continuity connection disclosed herein and axial reinforcement members, it has been found that the vertical load carrying capacity ($P_n$) of the column was increased by 58%, and the moment-resisting capacity ($M_n$) of the column was increased by 95%. In short, a shell that incorporates an exemplary continuity connection system disclosed herein along with axial reinforcement members can significantly improve the structural strength of a column. The present inventor has invented a novel axial reinforcement system that can be used in combination with the novel continuity connection system disclosed herein. Nevertheless, various axial reinforcement members or systems can be used in conjunction with the present invention. The present disclosure will focus on the continuity connection system, which can be added to practically any shell or jacket system that does or does not incorporate separate axial reinforcement members.

Figure 1:
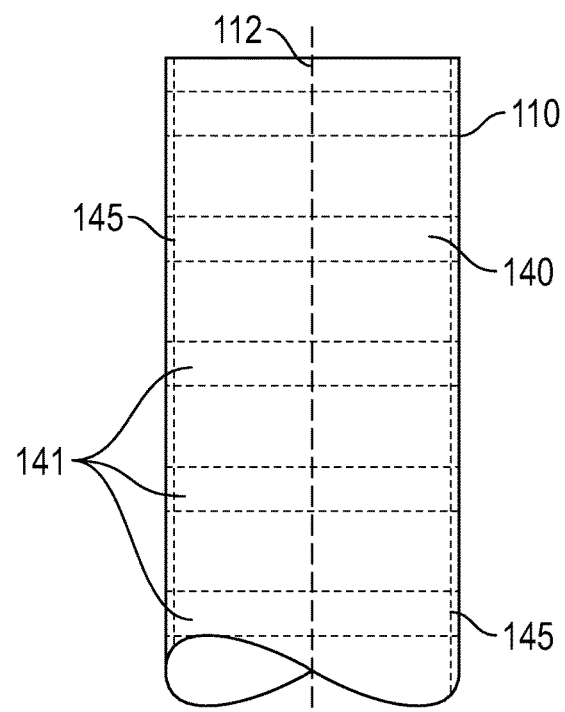
FIG. 1 shows a shell reinforced with longitudinally-spaced levels of carbon fiber fabric—inlayed and/or embedded—according to an exemplary embodiment of the invention.

FIG. 1 shows an exemplary shell 110 reinforced with levels 141 of a reinforcing material such as carbon fiber fabric 140/145. For clarity the reinforced shell 110 shown in FIG. 1 does not show the shell's seam, carbon fiber's seam, a column within the shell, the pockets, or a material extending between the pockets, such as a laminate. Shell 110 can have an inlayed carbon fiber fabric 140 wrapped around an interior radial surface of the shell 110, and/or an embedded carbon fiber 145 within the shell 110, either of which can be positioned in layers 141 or extend along a substantial longitudinal length of the shell 110 (reflected in dashed lines on the left and right-hand sides of the shell). Shell 110 can be made out of carbon fiber or a fiberglass material, for example, such that the shell 110 is lightweight and positionable around the column 101 as a unitary body or multiple unitary bodies, for example. Shell 110 can be pre-formed to be in a cylindrical, square, rectangular, or a partially-cylindrical shape such as a semi-circular shape, or can be pre-formed to be H-shaped or I-shaped, for example. Shell 110 can have one or more seams 111 running vertically in a direction of the shell's longitudinal axis 112 such that the shell 110 can be wrapped around the column. If the shell 110 is in a cylindrical shape, it may have one seam 111 and comprise a unitary body. If the shell is square shaped (in a cross-sectional view), the shell may have two seams, such that two unitary bodies are positioned around a column 101 and secured together.

FIG. 1 shows five layers or levels 141 of inlayed 140 and or embedded 145 carbon fiber fabric. The levels 141 are spaced apart longitudinally, but may overlap longitudinally. Of course, fewer or more layers than five can be used for either the embedded carbon fiber fabric 145 or the inlayed carbon fiber fabric 140 within the shell 110. The carbon fiber fabric 140 wrapped around an interior surface of the shell 110 may be saturated and adhered to the shell 110 with an adhesive, such as an epoxy or a resin that are compatible with both the shell 110 and carbon fiber fabric 140. In an exemplary embodiment, the carbon fiber fabric 140 or 145 does not overlap itself at ends thereof. Rather, the carbon fiber fabric 140 or 145 extends from one end to another end of itself, or extends proximate one end of shell 110 to proximate the other end of shell 110, and there is a gap or seam between the two ends of the carbon fiber fabric 140 or 145. The carbon fiber fabric 145 may extend up to the seam 111 or may extend into the shell connection, such as the mechanical connection shown in FIG. 2A, or the tongue-and-groove connection shown in FIG. 4. If ends of the carbon fiber fabric 140 or 145 were to overlap across the seam 111, it would prevent the shell 110 from opening in order to wrap around a column 102. The continuity connection system 100 disclosed herein is what provides continuity between the two ends of the carbon fiber fabric 140/145 and shell 110.

Figure 2A:
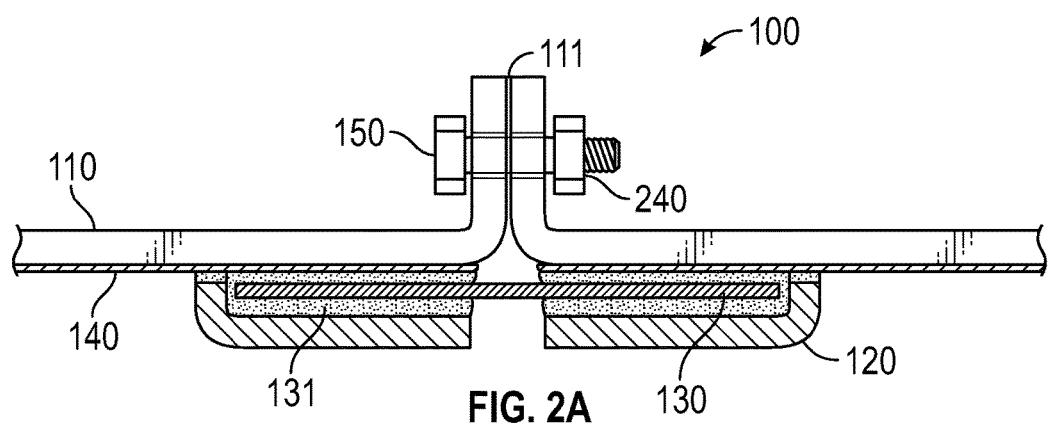
FIG. 2A shows a seam of a shell with two ends secured together using an exemplary continuity connection and a mechanical fastener.
Figure 2B:
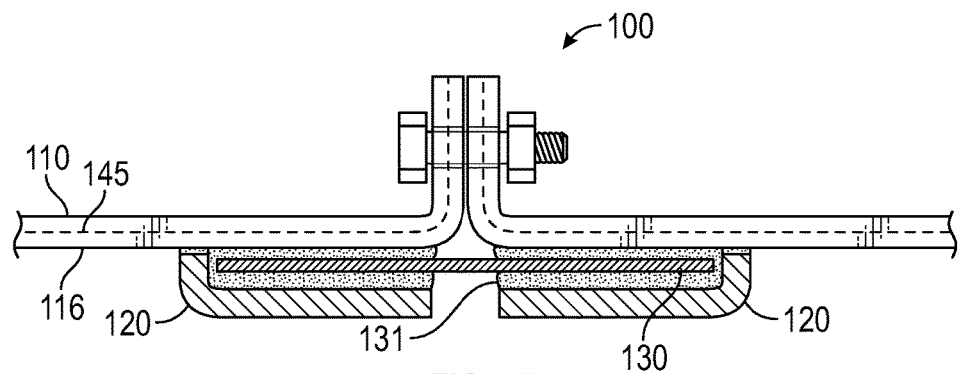
FIG. 2B shows a seam of a shell with two ends secured together using another exemplary continuity connection having a carbon fiber layer embedded within the shell.
Figure 2C:
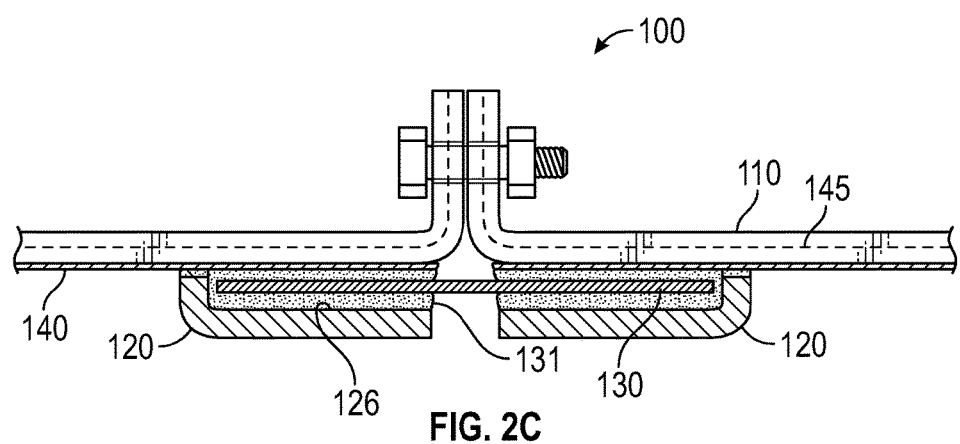
FIG. 2C shows a seam of a shell with two ends secured together similar to a combination of FIGS. 2A and 2B, i.e., with a carbon fiber fabric layer embedded within the shell and with a carbon fiber fabric layer inlayed on an interior surface of the shell.

The shell 110 can have an overlap over the seam, such as a 1"-8" overlap, to allow one end of the shell 110 to be secured to the other end of the shell 110 along an entire length of the vertical seam 111 of the shell 110. As shown in FIGS. 2A-2C, each end of the shell 110 along the shell's vertical seam 111 may extend substantially perpendicularly from the shell 110 such that the ends of the shell 110 may be secured together using a fastening mechanism 150, such as nuts and bolts 240 and/or an adhesive between the two ends of the seam 111 (adhesive not shown for clarity). Several nuts and bolts 240 may be used along the seam 111 of shell 110. Other types of fasteners could be used.

FIG. 2A shows an inlayed carbon fiber fabric 140 on an interior surface of shell 110. While FIG. 2A shows the inlayed carbon fiber fabric 140 extending up to a portion of the shell that extends perpendicularly upward for the fastening mechanism 150, the inlayed carbon fiber 140 can extend to the end of the shell 110, or proximate the end of the shell 110, on each side such that the inlayed carbon fiber 140 is positioned within fastening mechanism 150 along with the ends of the shell 110.

FIG. 2A also shows a pair of pockets 120, a reinforcing connective element 130, such as a carbon fiber laminate, positioned within each of the pockets 120, and an adhesive or an appropriate epoxy 131 within each of the pockets 120 to retain the carbon fiber laminate 130 within the pocket, and essentially bond the carbon fiber laminate 130 to the inlayed carbon fiber 140, thereby providing continuity between two ends of the inlayed carbon fiber fabric 140 and shell 110. The pockets 120 can be bonded to the inlayed carbon fiber fabric 140 and/or directly to the shell 110, depending on a width of the inlayed carbon fiber fabric 140. Such bonding of the pockets 120 to the carbon fiber fabric 140 or shell 110 can be achieved with an adhesive or an appropriate epoxy. In an exemplary embodiment the pockets 120 can be adhered (or further adhered) to the shell 110 with a "scrim" or "veil" positioned over each pocket 120 and sized to extend over a portion or all of pocket 120 with an excess portion that extends past a planer surface area of pocket 120 and attaches to the shell 110. The scrim may be saturated with an adhesive, such as a resin, and placed over pocket 120, and the excess/overlapping ends of the scrim may be adhered to the shell using the resin. The scrim may comprise a 4 oz. or 6 oz. bi-directional woven fiberglass fabric, for example, which aids in (1) attaching pocket 120 to shell 110, (2) retaining an epoxy 131 within the pocket 120, and (3) provides additional structural reinforcement to the continuity connection system 100.

FIG. 2B shows an embedded carbon fiber fabric 145 within the shell 110. Similar to the inlayed carbon fiber fabric 140, the embedded carbon fiber fabric 145 can extend up to, or proximate to, ends of the shell 110 on each side. FIG. 2A shows the embedded carbon fiber fabric 145 extending to the end of each side of the shell 110, thereby being positioned within fastening mechanism 150 along with the ends of the shell 110.

Similar to FIG. 2A, FIG. 2B also shows a pair of pockets 120, a carbon fiber laminate 130 positioned within each of the pockets 120, and an adhesive or an appropriate epoxy 131 within each of the pockets 120 to retain the carbon fiber laminate 130 within the pocket, and essentially bond the carbon fiber laminate 130 to the shell 110, thereby providing continuity between two ends of the shell 110 and embedded carbon fiber fabric 145. The pockets 120 can be bonded to the shell 110 with an adhesive or an appropriate epoxy. As explained above, a thin layer of 4 oz. or 6 oz. bi-directional fiberglass that overlays the entire pocket and beyond to assist in securing the pocket to the shell, as well as, providing a covering of the pocket opening to retain the filling epoxy. I will provide a drawing.

FIG. 2C shows a combination of FIGS. 2A-2B in that an embedded carbon fiber fabric 140 and an inlayed carbon fiber fabric 140 are used. The explanation above with respect to FIGS. 2A-2B is equally applicable to FIG. 2C.

Figure 3:
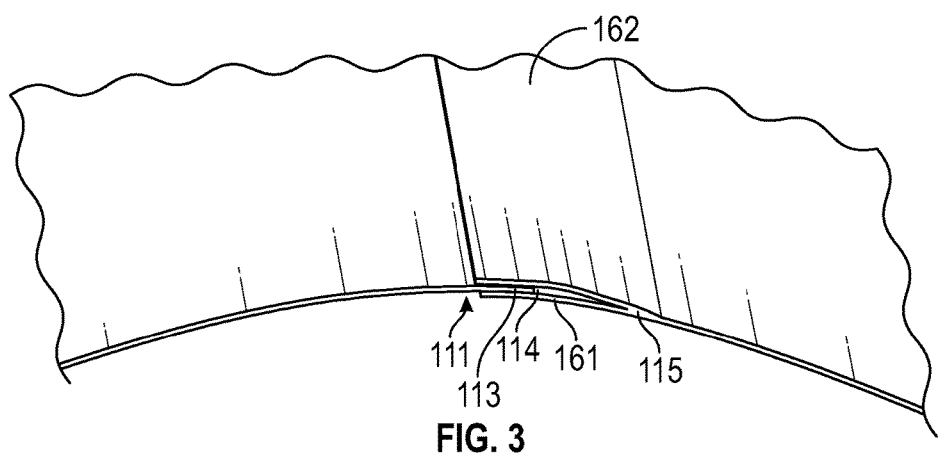
FIG. 3 shows a portion of a shell and its seam with two ends secured together using a tongue-in-groove connection.

FIG. 3 shows a tongue-and-groove structure that may alternatively be formed at the shell seam 111 as an alternative to the fastening mechanism 150 shown in FIGS. 2A-2C. One side 113 (i.e., the tongue) of the shell's seam 111 may be inserted into a groove 114. The other side 115 of the shell's seam 111 can be made up of a top groove portion 162 and a bottom groove portion 161, thereby forming a groove 114. To secure the ends 113, 115 together, an epoxy mastic 132 (FIG. 4) can be used alone or in combination with screws or other securing fasteners, for example, that may be driven through both sides (161, 162) of the groove 114 and through the side 113 of the shell portion (tongue) within the groove 114. Additionally or alternatively, an adhesive may be applied inside the groove 114 to further adhere the two sides 113, 115 of the shell 110 together. Various other methods may be used to secure the two ends 113, 115 of the shell 110 together.

Figure 4:
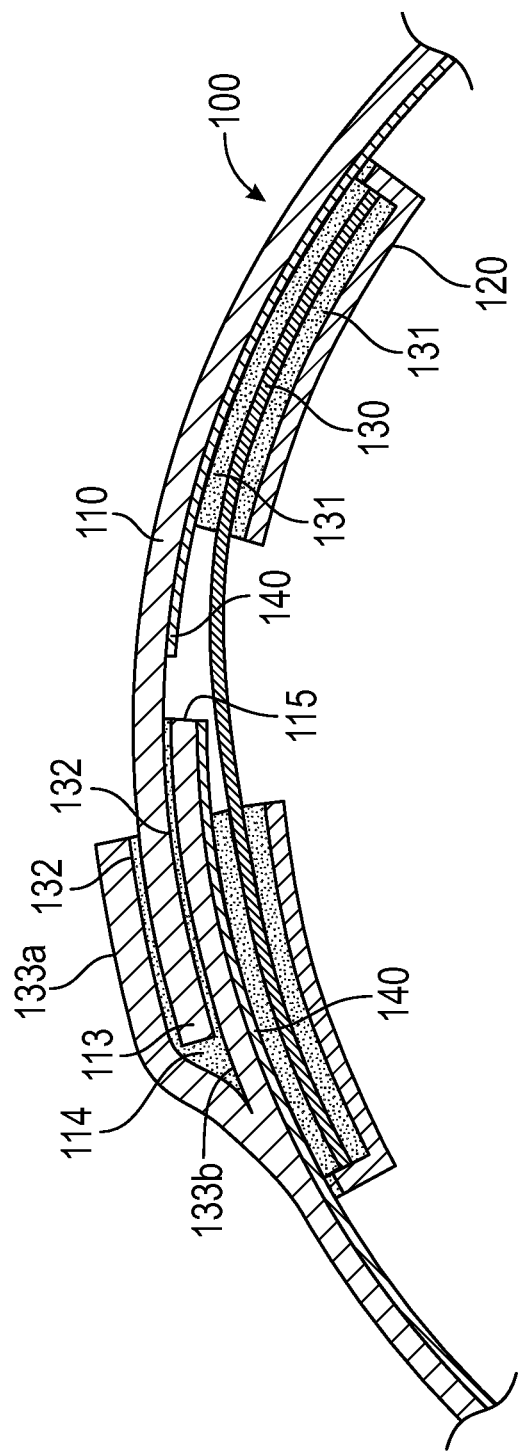
FIG. 4 shows a close-up axial, cross-sectional view of an exemplary continuity connection on a circular shell.

With reference to FIG. 4, an axial, cross-sectional view of an exemplary continuity connection system 100 is shown. The continuity connection system can comprise an inlayed carbon fiber fabric 140 extending (on one side) up to or proximate to an end of one side 115 of the shell 110, and on the other side 113 of the shell 110, up to or proximate to where side 115 extends. The inlayed carbon fiber fabric 140 on side 113 can extend up to an end of side 113 of shell 110 such that it is positioned within the groove 114 of the tongue-in-groove connection.

FIG. 4 also shows a pair of pockets 120 attached to the inside of the shell 110 on each side of a seam 111 in the shell 110, a carbon fiber laminate 130 positioned within each of the pockets 120, and an adhesive or an appropriate epoxy 131 within each of the pockets 120 to retain the carbon fiber laminate 130 within the pocket, and essentially bond the carbon fiber laminate 130 to the inlayed carbon fiber fabric 140 and shell 110. The pockets 120 and carbon fiber laminate 130 are positioned such that the carbon fiber laminate 130 overlaps the seam 111 of the shell 110 and a seam of the inlayed carbon fiber fabric 140, thereby providing continuity between the two ends of the carbon fiber fabric 140 and the two ends 113, 115 of the shell 110. The pockets 120 can be bonded to the inlayed carbon fiber fabric 140 and/or directly to the shell 110, depending on a width of the inlayed carbon fiber fabric 140. Such bonding of the pockets 120 to the carbon fiber fabric 140 or shell 110 can be achieved with an adhesive or an appropriate epoxy.

The laminate strip of carbon fiber 130 can comprise a carbon fiber reinforced polymer (CFRP) that has been hardened with an epoxy saturant, and may be considered, as an example, a "splice strip." Conventionally, carbon fiber laminate is made in a planar or linear form. The inventor has formulated an advantageous shape of a carbon fiber laminate 130 to be curved. Specifically, when using a round or cylindrical shell, it can be advantageous if the carbon fiber laminate 130 has a radius of curvature that matches or corresponds to a radius of curvature of the shell 110. This can be important where a highly stiff carbon fiber is used or formed into the carbon fiber laminate 130, such that the carbon fiber laminate is very rigid and unbendable. A carbon fiber laminate 130 having a radius of curvature is able to easily slide into and fit within pockets 120 on an interior side of a curved shell 110. In other examples, when the continuity connection is placed on a flat surface of the shell 110, such as when the shell comprises a square or rectangular shape, the elements of the continuity connection system, including the carbon fiber laminate 130, can be flat or planar at the location of the continuity connection, so as to match the planar nature of the shell 110 at that location.

Figure 6:
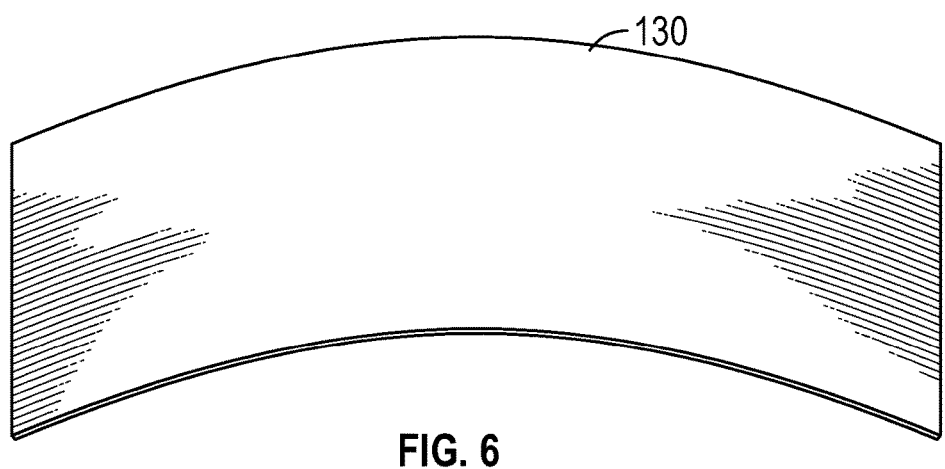
FIG. 6 shows a curved strip of laminate that can be used in an exemplary continuity connection.

FIG. 6 shows an exemplary curved splice strip of carbon fiber laminate 130 formulated by the inventor. Specifically, the curved strip of carbon fiber laminate 130 was formed by taking a "form" that matched a radius of curvature of a desired shell 110, placing a flexible release film (that provides a suitable texture specifically to provide a mechanical surface texture for adhesion bonding of hardened epoxy (resin) to hardened epoxy (resin), for example) over the form, placing one or more layers of a saturated carbon fiber fabric over the release film on the form, and optionally applying a top layer of release film over the saturated carbon fiber fabric, so that both sides of the laminate are textured to provide a superior bonding surface. An exemplary release film is a Teflon coated glass fabric, manufactured by The Composites Store, Inc., of Tehachapi, Calif. A flexible release film is preferably used because an appropriate epoxy will not adhere to the release film, and such a release film will prevent the carbon fiber and epoxy combination from adhering to the form. As an alternative to the form, a portion of the desired shell 110 can be used instead. Thus, a curved carbon fiber laminate 130 can be formulated to match, or substantially match, a radius of curvature of the round shell 110. A carbon fiber laminate 130 that substantially matches the radius of curvature of a round shell 110 is one that approximates the round curve of a round shell 110 and which allows the carbon fiber laminate 130 to be easily inserted into pockets 120 on an inside surface of the shell 110, or more specifically, easily inserted within channels of the pockets 120.

A particularly novel and non-obvious feature of the present invention is the pockets 120. FIG. 5B shows a cross-sectional front-end view of a pocket 120, taken along the cross-sectional lines shown in FIG. 5A. Pocket 120 can comprise a channel 121 within which the carbon fiber laminate 130 may slide through and be housed. The channel 121 allows a gap (125a and 125b) to be formed on a top and bottom of the carbon fiber laminate 130. Within this gap and the entirety of an internal volume of the pocket 120, an epoxy 131 may be deposited. The epoxy 131 allows the carbon fiber laminate 130 to adhere to the top inside portion 126 of the pocket 120, but more importantly, to adhere to the carbon fiber fabric layer 140 on an inside surface of the shell 110. When only an embedded carbon fiber fabric 145 is used, the epoxy 131 allows the carbon fiber laminate 130 to adhere to the top inside portion of the pocket 120 and to the interior surface of the shell 110.

The pocket 120 and carbon fiber laminate 130 can be sized so as to allow an optimal surface area over which the epoxy 131 can act to adhere the elements described above together. For example, a surface area of the top and/or bottom inside portion of the pocket 120 and a surface area of a portion of the shell 110 under the pocket 120 may both be approximately three to twelve square inches, or more particularly, approximately six square inches, and a surface area of the carbon fiber laminate 130 within one of the pockets 120 may be approximately three to twelve square inches, or more particularly, approximately six square inches. In such an example, an epoxy 131 deposited into the gaps 125a, 125b of the pocket 120 (which gaps 125a, 125b are created by an internal volume of the pocket 120 above and below the channel 121) would have six square inches of surface area to adhere the elements described above together, in both the top gap 125a and the bottom gap 125b. The inventor has found that a surface area of six square inches allows the continuity connection to have a tensile strength that exceeds the tensile strength of steel "rebar," for example, when an appropriate epoxy is used. Specifically, a tensile strength in excess of 10,000 psi can be achieved with a single continuity connection described above that has a surface area of six square inches. An appropriate epoxy in one example is an epoxy that has a proper surfactant, i.e., a wetting agent, thereby allowing the epoxy to bind strongly to another epoxy, such as an epoxy on or within the inlayed carbon fiber fabric 140.

While FIG. 5B shows a flat or rectangular pocket 120, it should be appreciated that the pocket 120 can have a radius of curvature that corresponds to that of the shell 110. For example, in FIG. 5B, the top surface of pocket 120 can curve upward on each side, and a bottom surface of pocket 120 (e.g., the bottom of each side of pocket 120) can also curve upward, such that the bottom of pocket 120 can mate flush with a curved inside surface of shell 110. An example of pockets 120 having a radius of curvature is shown in FIG. 4.

Figure 5A:
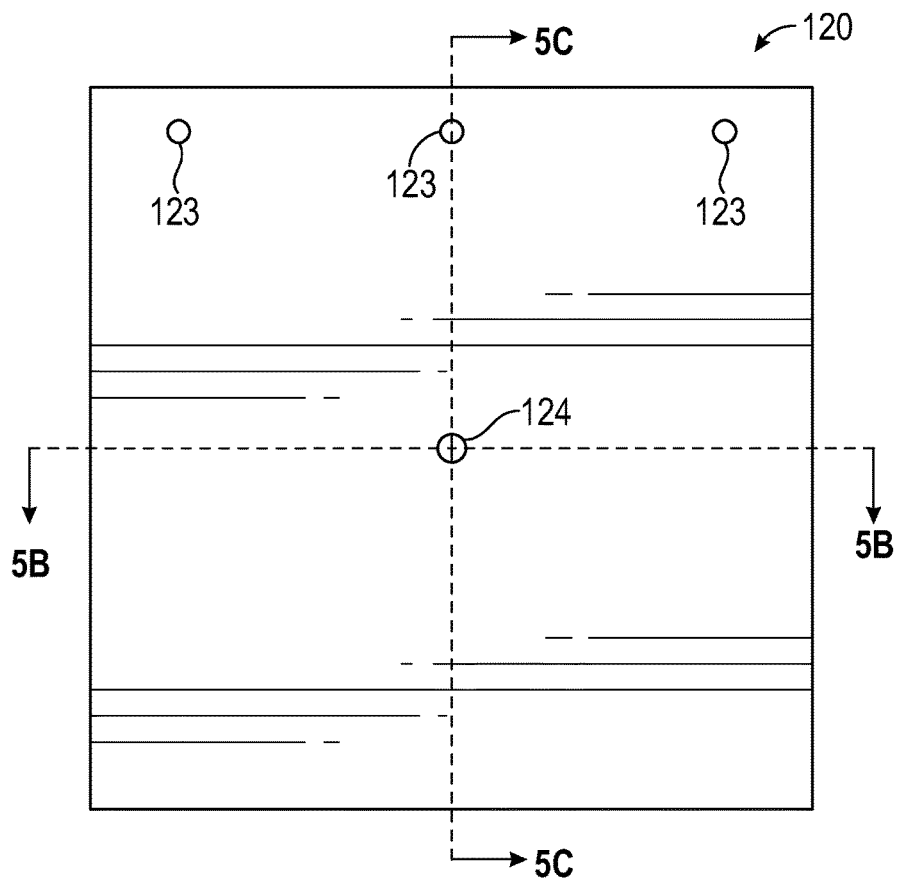
FIG. 5A shows a top view of the pocket, according to an exemplary embodiment.
Figure 5B:
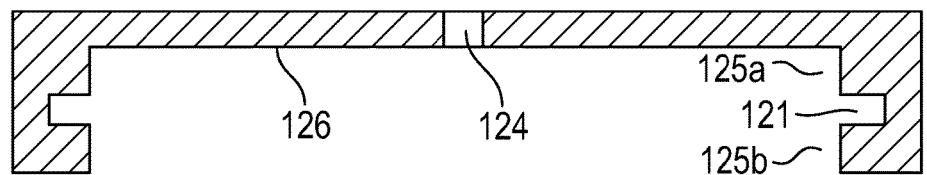
FIG. 5B shows a front-end (open end) view of a pocket of FIG. 5A.
Figure 5C:
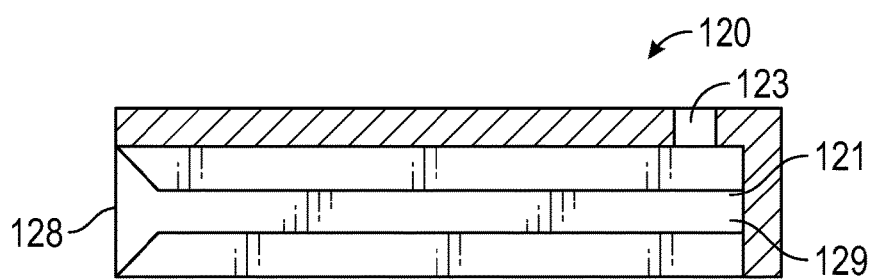
FIG. 5C shows a side, cross-sectional view of the pocket of FIG. 5A.

FIG. 5C shows a cross-sectional side view of the pocket 120 taken along arrows 5B in FIG. 5A. The channel 121 can extend to the rear end 129 of the pocket 120. As such, a carbon fiber laminate 130 can be slid to a rear end 129 of the pocket 120 within the channel 121. Also, a front end 128 of the channel 121 can taper downward and upward toward a bottom and a top of the pocket 120 such that the front-most portion 128 of the channel 121 is wider/taller than the rest of the channel 121, thereby allowing a carbon fiber laminate 130 to be guided and easily inserted into a front-most portion 128 of the channel 121. FIG. 5C also shows a hole 123, which may be one or more "witness holes" or a filling hole, as described in further detail below.

FIG. 5A shows a top view of the pocket 120. As seen in FIG. 5A, one or more "witness holes" 123 (e.g., two or three) may be formed at a rear end of the pocket 120. Fewer or more witness holes 123 may be used, and the size of the witness holes 123 may be the same or vary. These witness holes 123 extend from a top surface of the pocket 120 to the interior of the pocket 120, or more specifically, to the upper gap portion 125a within the pocket 120. The witness holes 123 allow a user to see when the interior of the pocket (or gap portions 125a, 125b) have been completely filled with an epoxy 131. It should be appreciated that an epoxy 131 can be inserted into the interior of the pocket 120 before a carbon fiber laminate 130 has be inserted into the channel 121. As such, it may be determined through the witness holes when an entire interior volume of the pocket 120 has been filled with an epoxy 131. Moreover, the uncured epoxy 131 may act as a lubricant to aid insertion of the carbon fiber laminate 130. As the user pumps or inserts epoxy 131 into the interior of the pocket 120 through, for example, filler hole 124, when the epoxy 131 has reached the rear and front surfaces of pocket 120 and starts to penetrate out through witness holes 123, the user can know that the epoxy 131 has completely filled the interior of the pocket 120.

With further reference to FIG. 4, exemplary layers of a continuity connection may be described. The layers on the right-hand side of FIG. 4, from interior to exterior, are as follows: top surface of pocket 120, epoxy 131 in top gap 125a within pocket 120, carbon fiber laminate 130 within channel 121 of pocket 120, epoxy 131 within bottom gap 125b within pocket 120, carbon fiber fabric 140 on interior surface of shell 110, and then shell 110. Additional layers on the left-hand side of FIG. 7 can be seen and are due to the tongue-and-groove connection. Such additional layers are as follows, starting from the layer of carbon fiber fabric 140: carbon fiber fabric 140, end 115 of shell (which may comprise or be separate from the next layer, i.e., bottom 133b of shell groove 114), epoxy 132, one end 113 (i.e., the tongue) of shell 110 inserted into the groove 114, epoxy 132, and top 133a of shell groove.

As explained above, FIG. 6. shows a curved strip of laminate 130 that can be used in an exemplary continuity connection. A curved strip of laminate is itself a novel and nonobvious feature of the present invention developed by the present inventor. As explained above, the laminate 130 may be curved to correspond to or approximate an inside radius of curvature of a shell 110 into which the laminate 130 is housed. Additionally or alternatively, the exemplary radius of curvature in the laminate 130 may correspond to a radius of curvature of the pockets 120, or more particularly the channel 121 of the pockets 120 into which the laminate 130 is inserted.

Figure 7:
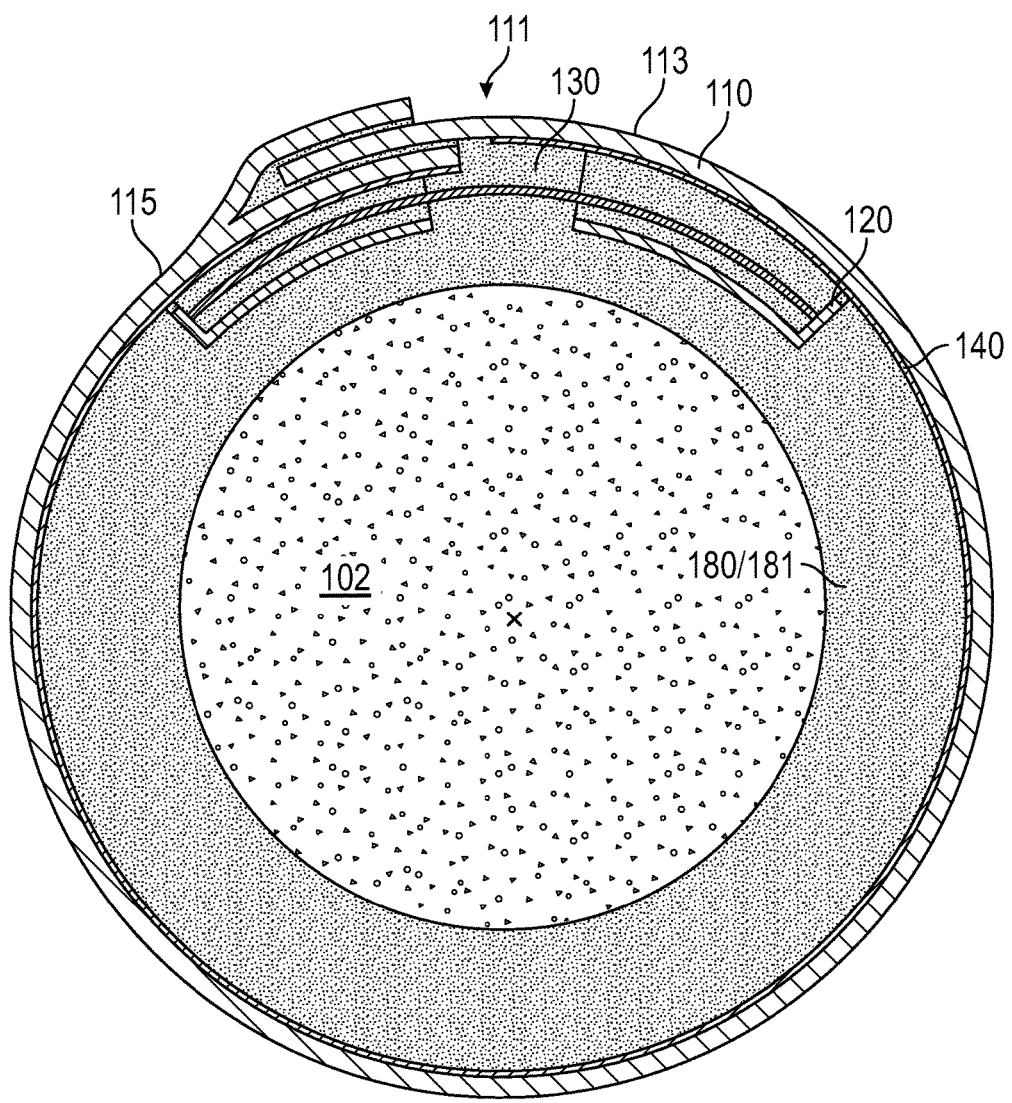
FIG. 7 shows a cross-section of an assembled system around a concrete column with an exemplary continuity connection, according to an exemplary embodiment.

FIG. 7 shows a cross-section of an exemplary continuity connection system 100 assembled around a column 102. It should be noted that the carbon fiber fabric 140 on the interior surface of the shell 110 can correspond to one "level" 141 of the interior layers of carbon fiber fabric shown in FIG. 1. Further, a plurality of continuity connections 100 can be used on a single reinforced shell 110. With reference to FIG. 1, five continuity connection systems 100 could be used, as five levels 141 of carbon fiber fabric 140 are shown wrapped around an interior of shell 110. Additional or fewer continuity connection systems 100 could be used, and the number of continuity connection systems 100 need not match the number of levels 141 of carbon fiber fabric 140 or the number of levels 141 of embedded carbon fiber fabric 145.

The continuity connection system 100 is intended to be located at a seam 111 of the carbon fiber 140/145 and shell 110. As shown in FIG. 7, a separation in the carbon fiber fabric 140 is necessarily located at a seam 111 of the shell 110, i.e., at an end 115 of the shell 110. This is true whether the carbon fiber (140) is wrapped around an interior surface of the shell 110 or whether it is embedded (145). As a result of the continuity connection system 100, the two ends of the carbon fiber fabric level 141 are connected together, thereby providing "continuity" across the carbon fiber fabric level 141. A carbon fiber fabric level 141 having such continuity can have a tensile strength that substantially surpasses the tensile strength of a conventional connection that connects two ends of a shell 110, such as a tongue-and-groove connection or a bolted connection at the seam of the shell. Having the carbon fiber fabric 140 on an interior surface of the shell 110 (or embedded (145) within the shell 110) is advantageous to having a carbon fiber fabric layer wrapped around an exterior of the shell 110 because the shell 110 can protect the carbon a fiber 140/145 from environmental elements and deterioration while at the same time protecting the column 102 from (further) deterioration. In other words, a primary purpose of the shell 110 is protection, while a primary purpose of the carbon fiber fabric 140/145 is to provide additional structural confinement reinforcement to the shell 110 and column 102.

Having the carbon fiber fabric 140/145 on an interior of, or embedded within, the shell, and having the continuity connection system 100 within the shell 110 allows the shell 110 to fulfill its primary purpose of protection to an even greater degree, in that the shell 110 also protects these additional elements. Moreover, when the carbon fiber fabric 140/145 and continuity connection 100 are within the shell 110, such components may largely be pre-installed by the manufacturer and protected by an outer surface of the shell 110 during transportation to a repair site, where a service team can easily install the protective and reinforcing structure to a column 102. The inventor has found that when the elements of the continuity connection system 100 (including carbon fiber fabric 140/145) are pre-installed within the shell 110 (or installed with the exception of the laminate 130), an installation can occur in as much as 66% less amount of time. In other words, using the protective and reinforcing elements of the present invention, 3× more columns can be repaired/rehabilitated in the same amount that one conventional system takes to install.

Referring again to FIG. 7, once all the continuity connection systems 100 have been installed and the shell 110 has been wrapped around the column 102 and secured (via a tongue-and-groove connection, a bolted connection, or another connection), an epoxy 180 or cementitious grout 181, for example, may be poured in between the gap formed by the column 102 and shell 110 (or carbon fiber layer 140). In a marine environment where the column 102 is surrounded by water, the epoxy 180 or cementitious grout 181 would displace the water because of water's lower density relative to the epoxy 180 or cementitious grout 181.

Figure 8:
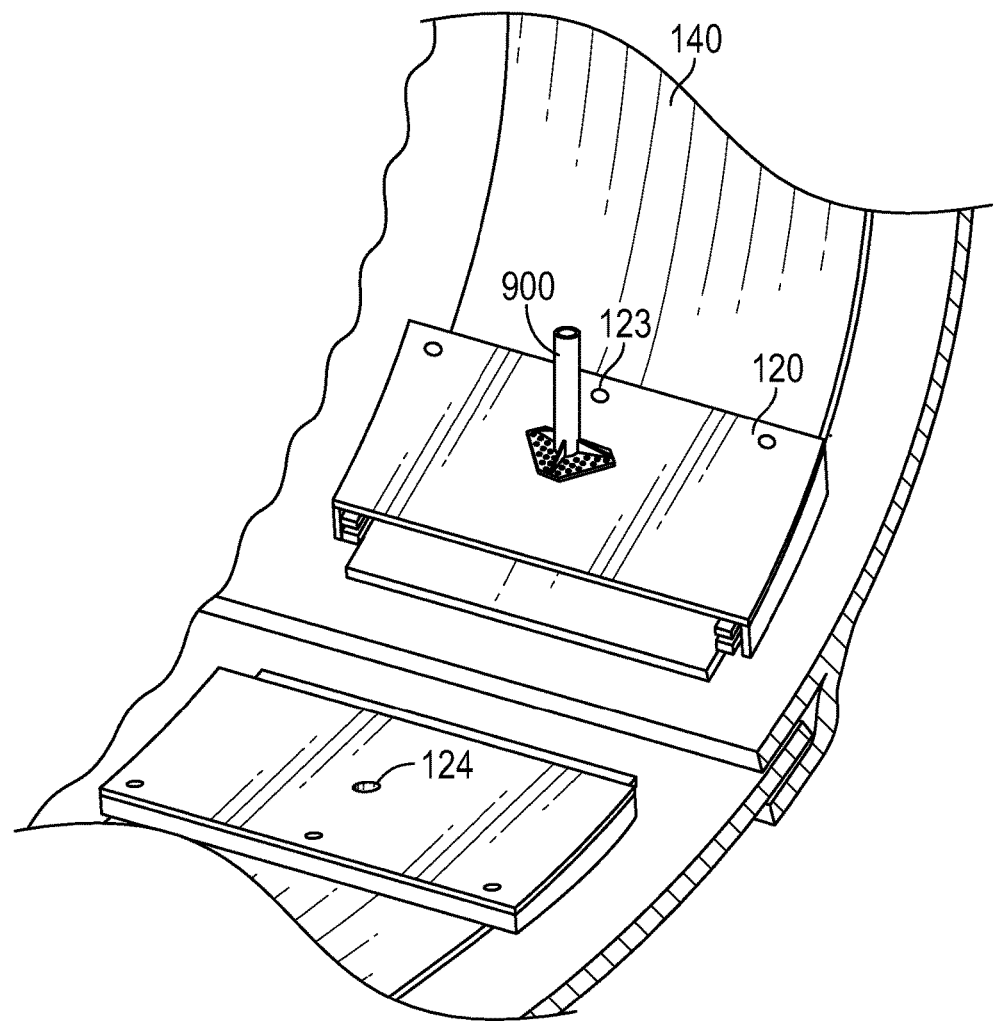
FIG. 8 shows an exemplary filler port on top of a pocket, according to an exemplary embodiment.
Figure 9:
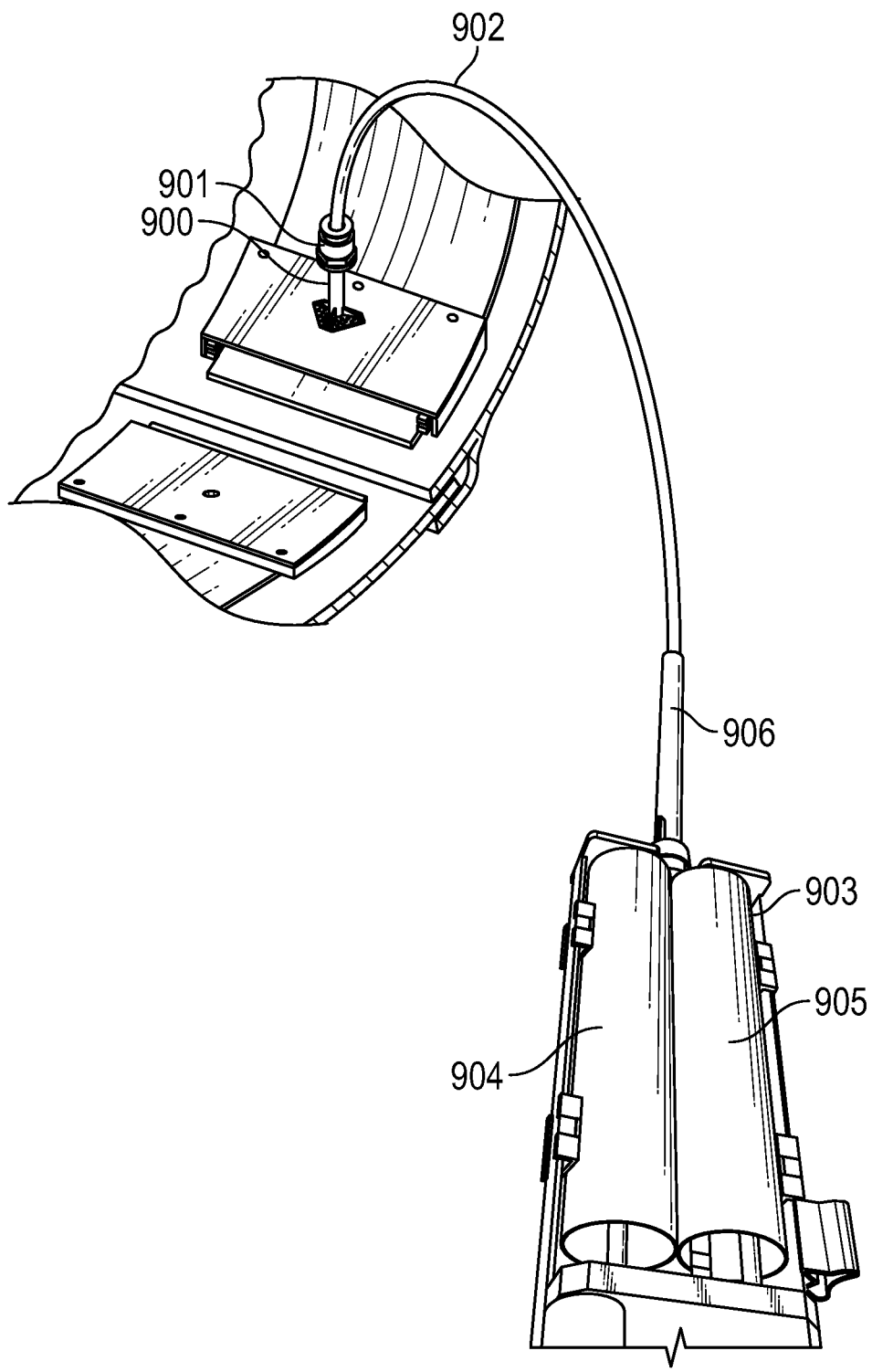
FIG. 9 shows a filler port connected to a tube connected to an epoxy injection gun, according to an exemplary embodiment.

Referring to FIGS. 8-9, to aid in insertion of the epoxy 132, a filling port 900 may be used. The filling port 900 may be placed over a witness hole 123 or over a fill hole 124 that is in fluidic communication with the interior of the pocket 120. The fill hole 124 may be located in the center of the pocket 120, and may be larger in diameter than witness holes 123. The port 900 may be connected to a conduit 901, which may be connected to a tube 902, which may be connected to an epoxy injection gun 903. The epoxy injection gun 903 may comprise two compartments or barrels 904, 905 comprising different chemical constituent parts of an appropriate epoxy 132. Upon triggering exit of the constituent parts from barrels 904, 905, the constituent parts may mix in a mixing tube 906 before entering tube 902. The epoxy 132 may travel through tube 902, conduit 901, and port 900, and reach an interior of pocket 120. Epoxy 132 may be "witnessed" as filling an entirety of the interior of pocket 120 when the epoxy 132 begins to penetrate witness holes 123 and the open end of the pocket 120. In this manner, the pockets 120 may be quickly filled with epoxy 132. The filling port 900 may be removed prior to installation of the shell 110 around a column 101. Alternatively, a tube (e.g., tube 902) may be positioned over fill hole 124 (or over a witness hole 123), and an epoxy may be injected through tube 902 and fill hole 124 to fill pocket 120 with the epoxy.

To aid in preventing the epoxy 132 from exiting or oozing out a front of the pockets 120, one or more flexible materials, such as two sheets of a fiber glass fabric, can be adhered to cover the front of pockets 120. As described above, the scrim may be used to fulfill this purpose. A flexible material or scrim can be adhered to the front of the pockets 120, or over the entirety of pocket 120, using the same epoxy 132 that will fill the pockets 120, or using a resin, for example. Alternatively, a different epoxy or adhesive may be used. While the flexible material or scrim can prevent an epoxy 132 from exiting or oozing out of an interior of pockets 120, such flexible material can be thin enough to be easily penetrated by laminate 130 when it comes time to insert laminate 130 into each pocket 120. Alternatively, the flexible material or scrim can be sliced with a blade at an opening of the pocket 120 to allow a laminate 130 to easily slide therethrough. In the event the flexible material or scrim is not sliced, a laminate 130 that pierces the flexible material may penetrate it only to the extent that the flexible material or scrim still prevents an epoxy 132 from exiting or oozing out of the pockets 120. In this manner, the epoxy 132 may be retained in pockets 120 until the epoxy 132 cures.

An exemplary method of installing a continuity connection 100 is described below, according to exemplary embodiments of the present disclosure. The steps or operations of the method are described in a particular order for convenience and clarity; many of the discussed operations can be performed in a different sequence or in parallel, and some steps may be excluded, without materially impacting other operations. The method, as discussed, includes operations that may be performed by multiple different actors, devices, and/or systems. It is understood that subsets of the operations discussed in the method attributable to a single actor, device, or system could be considered a separate standalone process or method.

First, a shell 110 is formed to a desired cross-sectional shape and length. For example, the shell 110 could be formed to be a cylinder that fully encapsulates a column 102, such as a timber column or a cement column, for example. The shell could be formed with an embedded carbon fiber 145. The shell 110 could be formed with a tongue-and-groove, or with a protruding, perpendicular section comprising holes for bolts or other fastening elements.

Next, a carbon fiber fabric 140 may be adhered to an interior surface of the shell 110 using an adhesive or epoxy saturant. The carbon fiber fabric 140 may then harden as the epoxy saturant fully cures.

Next, two adjacent pockets 120 may be adhered to an interior surface of the shell 110 over each layer of carbon fiber fabric 140 (or embedded carbon fiber fabric layers 145), and on each end/side 113, 115 of the shell 110. The pockets 120 may be structured such that they comprise a radius of curvature that matches or corresponds to a radius of curvature of the shell 110. The pockets may be adhered to the shell 110 using an epoxy. Additionally or alternatively, a flexible material or scrim saturated in a resin or epoxy may used to attach the pocket 120 to shell 110 over carbon fiber fabric layer 140/145.

The carbon fiber laminate 130 may similarly be formed, as described above, such that it comprises a radius of curvature that matches or corresponds to a radius of curvature of the shell 110 when a round/cylindrical shell 110 is used.

The shell 110 and pre-installed carbon fiber fabric 140/145 and pockets 120 may be transported to a location of a desired column 102 to protect/reinforce. The carbon fiber laminate 130 may also be transported along with the shell 110, though not yet installed within the pockets 120.

An epoxy adhesive 131 may be pumped or inserted into an interior of one or each of the two adjacent pockets 120 through fill hole 124. Next, the carbon fiber laminate 130 may be inserted into a channel 121 of one of the pockets 120. Alternatively, the carbon fiber laminate 130 may be inserted after the shell 110 has been wrapped around the desired column 102. The epoxy 131 may be allowed to cure, at least partially. If only one pocket 120 has been filled with epoxy 131, the other pocket 120 of the pair may now be filled with epoxy 131.

The shell 110 may be opened up and wrapped around the desired column 102 such that it encapsulates the column 102 along a longitudinal length of the column 102.

Both ends of the carbon fiber laminate 130 and/or the free end of the carbon fiber laminate 130 may now be inserted into the channel 121 of the pocket(s) 120. The tongue-and-groove connection, or bolted connection, for example, may now be connected and/or filled with adhesive, as the two ends of the shell 110 at the seam 111 are connected together.

A tightening strap may be wrapped around the shell 110 to prevent expansion of the shell 110 as the epoxy 180 or cementitious grout 181 cures.

A seal may be placed at a bottom of the shell 110 in the gap formed by shell 110 and column 102 to prevent an epoxy 180 or cementitious grout 181 from exiting the gap at a bottom of shell 110. An epoxy 180 or cementitious grout 181 may be poured into the gap between the shell 110 and the column 102. The epoxy 180 or cementitious grout 181 may then be allowed to cure over the next several minutes or hours, such as twenty-four or seventy-two hours.

In this exemplary manner, a shell 110 that incorporates an exemplary continuity connection system 100 disclosed herein can significantly improve the structural strength of a column.

ADDITIONAL NOTES

The above detailed description includes references to the accompanying drawings, which form a part of the detailed description. The drawings show, by way of illustration, specific embodiments in which the disclosure can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) can be used in combination with each other. Other examples can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above detailed description, various features can be grouped together to streamline the disclosure. This should not be interpreted as intending that an unclaimed disclosed feature is essential to any claim. Rather, inventive subject matter can lie in less than all features of a particular disclosed example. Thus, the following claims are hereby incorporated into the detailed description as examples or embodiments, with each claim standing on its own as a separate example, and it is contemplated that such examples can be combined with each other in various combinations or permutations. The scope of the invention should be determined with reference to the appended claims, along with the full scope of equivalents to which such claims are entitled.

The invention claimed is:

1. A system comprising:
a shell configured to encapsulate at least a portion of a weight-bearing member, the shell having a longitudinal length extending from a top to a bottom of the shell, the shell also having a first circumferential end portion and a second circumferential end portion such that there is a first discontinuity of the shell between the first and second circumferential end portions;
a reinforcing layer inlayed on an interior surface of the shell, the reinforcing layer extending proximate the first circumferential end portion to proximate the second circumferential end portion of the shell such that there is a discontinuity of the reinforcing layer between the first and second circumferential end portions;
a first pocket and a second pocket adhered to the shell, the first and second pockets longitudinally extending only along a portion of the longitudinal length of the shell, the first pocket and second pocket being positioned radially inwardly of the first end portion and second end portion of the shell, respectively, each pocket having an interior portion; and
a laminate having a first end and a second end, the first end positioned within the interior portion of the first pocket, and the second end positioned within the interior portion of the second pocket, the first end adhered to the first pocket and the second end adhered to the second pocket,
wherein the first pocket and the second pocket are positioned on the shell such that the laminate extends across the first circumferential end portion and the second circumferential end portion to provide continuity between two ends of the reinforcing layer,
wherein the first pocket and the second pocket are adhered to the shell via the reinforcing layer such that at least a portion of the first and second pockets are adhered to the reinforcing layer with an adhesive.

2. The system of claim 1, wherein the first and second pockets comprise a channel within which a portion of the laminate is positioned.

3. The system of claim 2, wherein the channel creates a top gap and a bottom gap within the interior portion of the pocket.

4. The system of claim 3, further comprising an epoxy with the top gap and the bottom gap, the epoxy adhering the first and second end of the laminate to the first and second pockets, respectively.

5. The system of claim 1, wherein the reinforcing layer is a carbon fiber fabric layer.

6. The system of claim 1, wherein the first circumferential end portion and second circumferential end portion of the shell are connected together with a tongue-and-groove connection.

7. The system of claim 1, wherein the first circumferential end portion and second circumferential end portion of the shell are connected together with at least one mechanical fastener.

8. The system of claim 1, wherein the shell is cylindrical and the weight-bearing member is a column.

9. The system of claim 8, wherein the laminate is a curved strip of laminate having a radius of curvature approximating a radius of curvature of the shell.

10. The system of claim 1, wherein the column is a cement column, a steel column, or a timber column.

11. The system of claim 1, wherein the first pocket and the second pocket comprise at least one witness hole for observing an extent to which the first or second pocket are filled with an epoxy.

12. The system of claim 1, further comprising a filling portal adapted to convey an epoxy from a source to within the first or second pocket.

13. A method comprising:
providing a shell configured to encapsulate at least a portion of a weight-bearing member, the shell having a longitudinal length extending from a top to a bottom of the shell, the shell also having a first circumferential end portion and a second circumferential end portion such that there is a first discontinuity of the shell between the first and second circumferential end portions;
inlaying a reinforcing layer within the shell such that the reinforcing layer extends proximate the first circumferential end portion to proximate the second circumferential end portion of the shell such that there is a discontinuity of the reinforcing layer between the first and second circumferential end portions;

adhering a first pocket and a second pocket to an interior of the shell, the first and second pockets longitudinally extending only along a portion of the longitudinal length of the shell, the first pocket and second pocket being positioned radially inwardly of the first end portion and second end portion of the shell, respectively, each pocket having an interior portion;

providing a laminate having a first end and a second end;

positioning the first end of the laminate within the interior portion of the first pocket, and positioning the second end of the laminate within the interior portion of the second pocket; and adhering the first end of the laminate to the first pocket and adhering the second end of the laminate to the second pocket, wherein the first pocket and the second pocket are positioned on the shell such that the laminate extends across the first circumferential end portion and the second circumferential end portion to provide continuity between two ends of the reinforcing layer, wherein the first pocket and the second pocket are adhered to the shell via the reinforcing layer such that at least a portion of the first and second pockets are adhered to the reinforcing layer with an adhesive.

14. The method of claim 13, wherein:

the shell is cylindrical and the weight-bearing member is a cement column, a steel column, or a timber column, and the laminate is a curved strip of laminate having a radius of curvature approximating a radius of curvature of the shell.

* * * * *